UNITED STATES PATENT OFFICE.

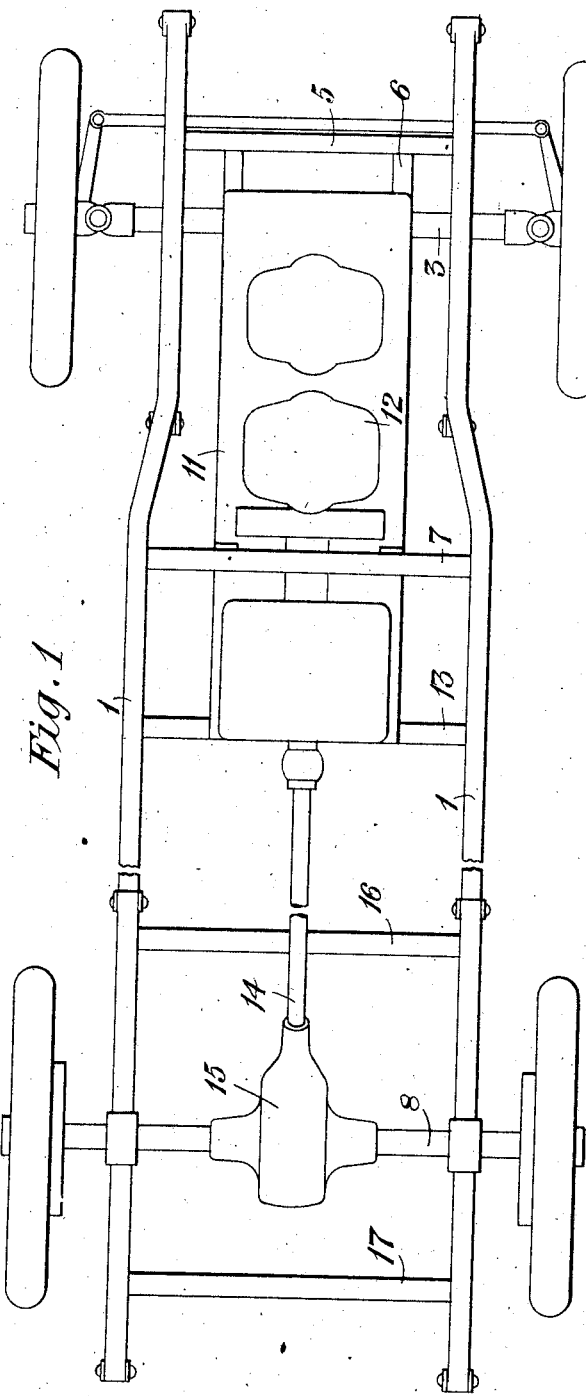
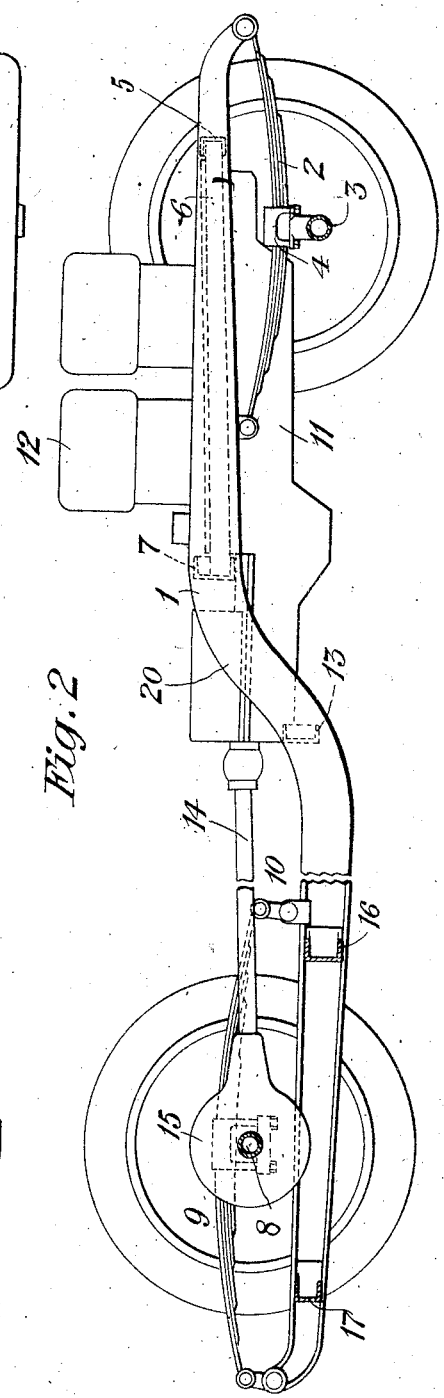

HOWARD STARK, OF PAWLING, NEW YORK.

MOTOR-VEHICLE.

1,223,633. Specification of Letters Patent. Patented Apr. 24, 1917.

Application filed August 24, 1912. Serial No. 716,815.

*To all whom it may concern:*

Be it known that I, HOWARD STARK, of Pawling, county of Dutchess, and State of New York, have invented new and useful Improvements in Motor-Vehicles, of which the following is a specification.

This invention relates to motor vehicles and particularly to the chassis or running gear therefor and has for its object to provide a vehicle structure having the combined advantages of a low center of gravity, a straight line drive and practical freedom from liability of side slipping or "skidding."

To this end my invention consists of the novel vehicle construction hereinafter described and claimed and illustrated in the accompanying drawing in which Figure 1 is a plan view of a motor vehicle chassis embodying my invention, and Fig. 2 is a side elevation of the structure shown in Fig. 1 certain parts being shown in section.

Referring now to the drawings, in which like reference characters indicate like parts throughout the several views, 1 indicates the side members of a motor vehicle frame, to the underside of the forward ends of which are attached in the usual manner, the springs 2 which rest on the front axle 3, and are attached thereto by means of the clips 4. The side members 1 are connected near their front ends by a cross member 5 to which are attached the longitudinal engine supports 6 extending from the member 5 to a second cross member 7 as shown in dotted lines in Fig. 2. Immediately to the rear of the cross member 7 the side members 1 are curved downwardly at 20 to a plane below the rear axle 8 of the vehicle and are then extended rearwardly beneath the axle 8 to the usual distance beyond the axle. For connecting the frame to the axle, springs 9 are attached at their middle points to the axle and connected at their ends by depending links 10 to the side members 1 of the frame.

The base casting 11 of the engine 12 is supported on the members 6 as shown in such manner that the engine shaft extends beneath the cross member 7. The base casting 11 also extends beneath the member 7 and rests on a cross member 13 at its rear end, the rear portion of the casting serving as part of the transmission casing. From the transmission the propeller shaft 14 extends to the differential 15 on the rear axle in the usual manner. To give the necessary rigidity to the frame other cross members 16, 17 may be provided whenever necessary.

In motor vehicles of the type to which my invention relates it is the usual practice to construct the side members of the frame of straight bars supporting them above both axles. It has been demonstrated that when so constructed there is a marked tendency for the vehicle to turn over, particularly when rounding curves, due to the high center of gravity of the load. To overcome this difficulty some vehicles have been constructed with their frames suspended from both axles, but in such construction the tendency to "skid" or slip sidewise is much increased due to the side thrust coming more nearly in line with the wheel axles. Such skidding is particularly dangerous when it occurs with the front wheels for the reason that it not only changes the direction of movement of the vehicle, but interferes with the control of the vehicle through the steering gear. Further the weight on the front axle is chiefly that of the engine, and the center of gravity of the engine is not at as high a point as that of the load carried in the body of the vehicle which is carried by the rear axle and hence the tendency to upset comes principally from the weight in the body. With my improved frame this weight is lowered quite as much as with the so called "under slung" frame. Moreover, the employment of the underslung frame in front does not materially lower the center of gravity, because to have the necessary road clearance the engine cannot be lowered to any appreciable extent, the engine frame being usually supported on "stilts" from the main frame.

From the above it will be plain that with my invention I obtain all the advantages of the underslung frame without its dangerous tendency to skid. Furthermore, my improved frame is particularly adapted for the straight-line drive, the cross members 7 and 13 serving as convenient supports for the engine and transmission while the cross member 16 is entirely beneath and out of the way of the shaft 14.

Having thus described my invention, what I claim and desire to secure by Letters Patent is:—

In a motor vehicle the combination comprising a front axle provided with driven wheels and a rear axle provided with driving wheels, a frame comprising side members having their front portions extending above, and supported by, the front axle, and their rear portions extending beneath and suspended from the rear axle, springs interposed between the rear axle and the frame and cross members connecting such side members adjacent their respective ends.

In witness whereof I have hereunto set my hand at the city of Pawling, county of Dutchess and State of New York, this 14 day of August, 1912.

HOWARD STARK.

Witnesses:
A. M. LEACH,
WM. T. CHAPMAN.